US012621151B2

(12) United States Patent
Hu et al.

(10) Patent No.: US 12,621,151 B2
(45) Date of Patent: May 5, 2026

(54) METHOD FOR IDENTITY VERIFICATION AND SYSTEM THEREOF

(71) Applicant: Turing Chain Ltd., Taipei City (TW)

(72) Inventors: Yao-Chieh Hu, Taipei City (TW); Xin-Hong Chen, Taipei City (TW)

(73) Assignee: TURING CHAIN LTD., Taipei City (TW)

( * ) Notice: Subject to any disclaimer, the term of this patent is extended or adjusted under 35 U.S.C. 154(b) by 346 days.

(21) Appl. No.: 18/136,662

(22) Filed: Apr. 19, 2023

(65) Prior Publication Data
US 2024/0179008 A1 May 30, 2024

(30) Foreign Application Priority Data
Nov. 28, 2022 (TW) .................................. 111145503

(51) Int. Cl.
*H04L 9/32* (2006.01)

(52) U.S. Cl.
CPC ............ *H04L 9/321* (2013.01); *H04L 9/3226* (2013.01); *H04L 9/3247* (2013.01)

(58) Field of Classification Search
CPC .......... H04L 9/321; H04L 9/3226; H04L 9/50
See application file for complete search history.

(56) References Cited

U.S. PATENT DOCUMENTS

2012/0290592 A1    11/2012  Ishii
2012/0317414 A1*   12/2012  Glover .................. H04L 9/0861
                                                              713/165

2018/0077135 A1*    3/2018  Wardman ............ H04L 63/0421
2018/0227130 A1     8/2018  Ebrahimi et al.
2019/0305949 A1*   10/2019  Hamel ................... H04L 9/3239
2019/0312877 A1    10/2019  Zhang et al.
2020/0226242 A1     7/2020  Balaraman et al.
2021/0319132 A1*   10/2021  Zhang .................... H04L 9/3239
2022/0021528 A1*    1/2022  Dawson, III .......... H04L 9/3236
2023/0132505 A1*    5/2023  Lee ........................ H04L 9/3239
                                                              713/156
2023/0350988 A1*   11/2023  Bae .......................... G06F 21/31

FOREIGN PATENT DOCUMENTS

CN          107851111 A      3/2018
JP        2012-238050 A     12/2012
JP        2019-522412 A      8/2019
TW            I773161 B      8/2022
WO     WO 2016/179334 A1    11/2016

* cited by examiner

*Primary Examiner* — David J Pearson
(74) *Attorney, Agent, or Firm* — Birch, Stewart, Kolasch & Birch, LLP

(57) ABSTRACT

Disclosed are techniques for identity verification. In one aspect, the method includes determining whether a user account has the identity data; obtaining from a blockchain the hash value of the identity data signed with the private key if it is determined that the user account has the identity data; using the public key to verify the hash value of the identity data signed with the private key to obtain a decrypted hash value of the identity data; and comparing the decrypted hash value of the identity data with the hash value of the identity data stored in the database to generate an identity verification result.

6 Claims, 6 Drawing Sheets

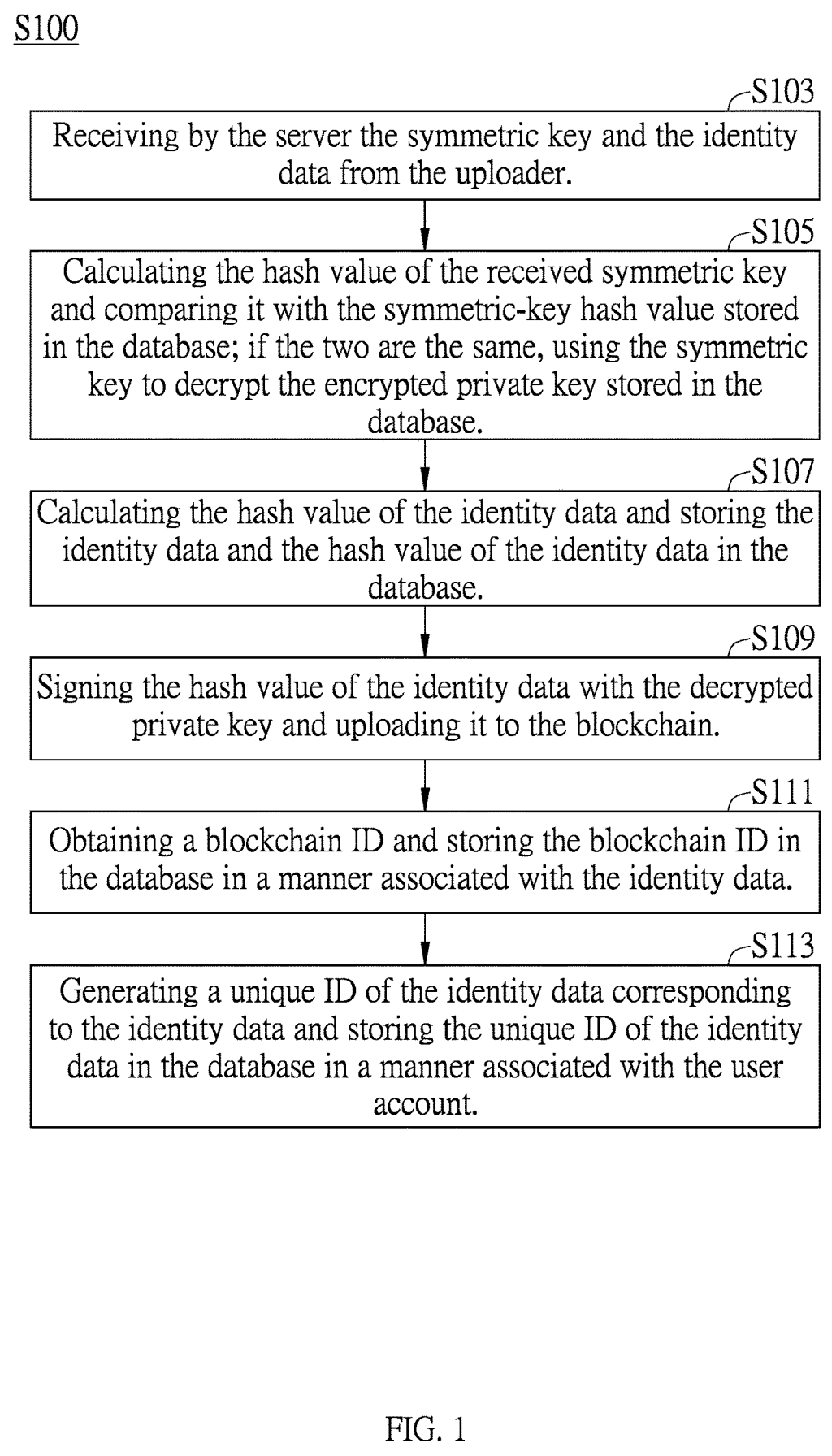

S100

S103

Receiving by the server the symmetric key and the identity data from the uploader.

S105

Calculating the hash value of the received symmetric key and comparing it with the symmetric-key hash value stored in the database; if the two are the same, using the symmetric key to decrypt the encrypted private key stored in the database.

S107

Calculating the hash value of the identity data and storing the identity data and the hash value of the identity data in the database.

S109

Signing the hash value of the identity data with the decrypted private key and uploading it to the blockchain.

S111

Obtaining a blockchain ID and storing the blockchain ID in the database in a manner associated with the identity data.

S113

Generating a unique ID of the identity data corresponding to the identity data and storing the unique ID of the identity data in the database in a manner associated with the user account.

FIG. 1

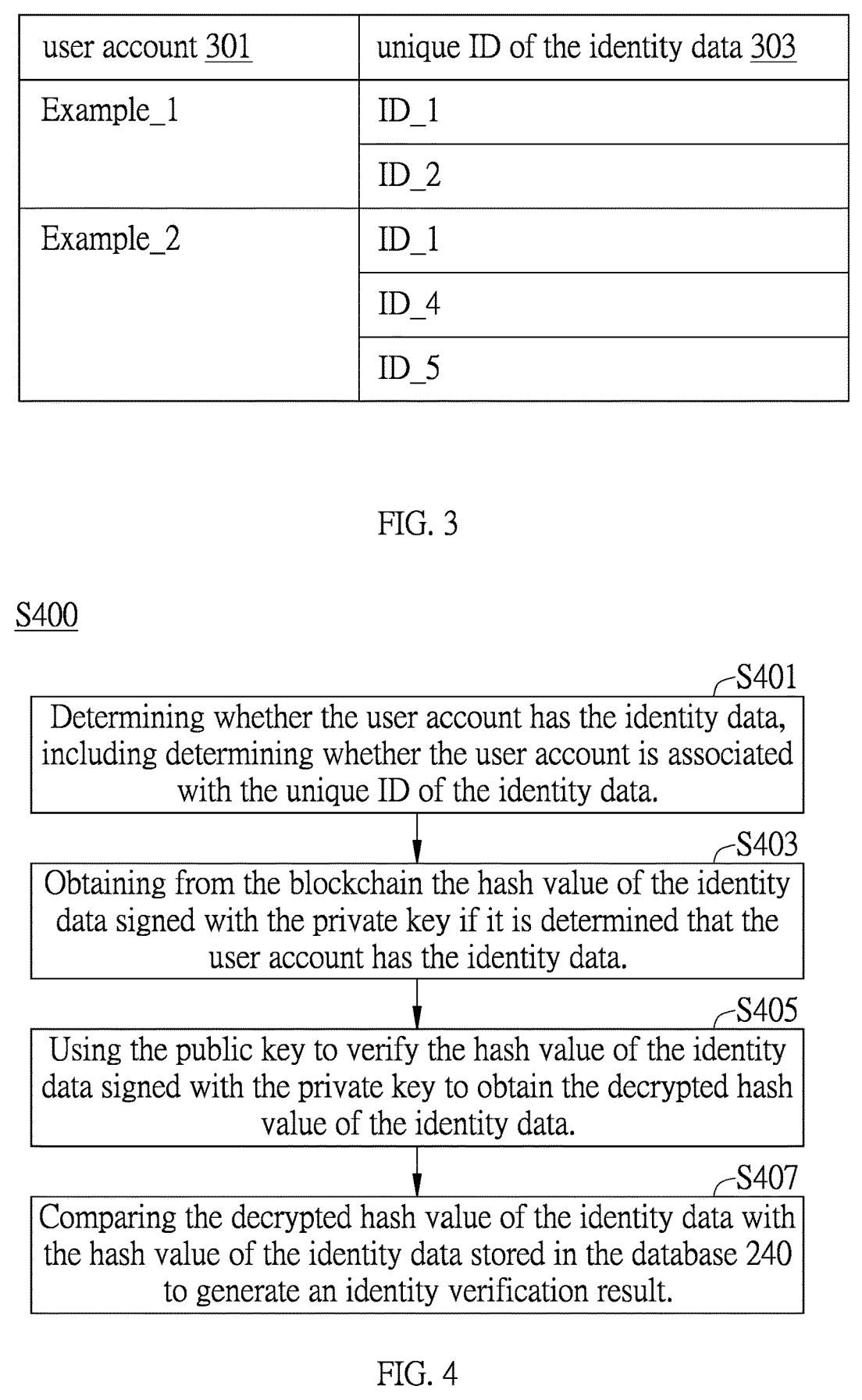

| user account 301 | unique ID of the identity data 303 |
|---|---|
| Example_1 | ID_1 |
| | ID_2 |
| Example_2 | ID_1 |
| | ID_4 |
| | ID_5 |

Determining whether the user account has the identity data, including determining whether the user account is associated with the unique ID of the identity data.

S403

Obtaining from the blockchain the hash value of the identity data signed with the private key if it is determined that the user account has the identity data.

S405

Using the public key to verify the hash value of the identity data signed with the private key to obtain the decrypted hash value of the identity data.

S407

Comparing the decrypted hash value of the identity data with the hash value of the identity data stored in the database 240 to generate an identity verification result.

FIG. 4

METHOD FOR IDENTITY VERIFICATION AND SYSTEM THEREOF

BACKGROUND OF THE INVENTION

1. Field of the Invention

Aspects of the disclosure relate to the technical field of identity verification. Specifically, the aspects of the disclosure relate to an identity verification method and system using blockchain technology.

2. Description of the Prior Art

With the development of the Internet, the demand for verifying the identities and permissions of users online has increased. For example, applications or websites may require users to provide identity data or require users to complete real-name authentication to allow users to log in or provide further services. However, providing personal information to applications or websites may increase the risk of a data breach. In addition, it is difficult for applications or websites to identify users with forged identities. Therefore, it is necessary to provide an identity verification method that reduces the risk of personal information breaches and prevents identity forgery.

SUMMARY OF THE INVENTION

It is an object of the present disclosure to provide an identity verification method, which can avoid providing personal data to the application or website, so as to reduce the risk of a data breach.

It is an object of the present disclosure to provide an identity verification method, which can avoid the problem of identity forgery by taking advantage of the tamper-proof properties of blockchains.

In an embodiment, a method for identity verification is implemented by a server, and a database of the server stores a public key of a key pair, identity data, and a hash value of the identity data, wherein the server is connected to a blockchain through a communication network, and the blockchain stores the hash value of the identity data signed with a private key of the key pair. The method includes: determining whether a user account has the identity data; obtaining from the blockchain the hash value of the identity data signed with the private key if it is determined that the user account has the identity data; using the public key to verify the hash value of the identity data signed with the private key to obtain a decrypted hash value of the identity data; and comparing the decrypted hash value of the identity data with the hash value of the identity data stored in the database to generate an identity verification result.

In another embodiment, a system for identity verification includes a server and a database, wherein the server is connected to a blockchain through a communication network, and the system is configured to: receive an input of a user account and a user password from a user of an application through the communication network; after confirming that the user account number and the user password are correct, verify the identity of the user according to the method of the embodiment mentioned above to generate an identity verification result, wherein the identity verification result includes success or failure; and return the identity verification result to the application, wherein the application allows the user to log in to the application if the identity verification result received shows success.

With this configuration, the user does not need to repeatedly provide identity data to different applications, thereby reducing the risk of a data breach. At the same time, due to the tamper-proof properties of blockchain, the application can also prevent users with forged identities from logging into the application.

BRIEF DESCRIPTION OF THE APPENDED DRAWINGS

FIG. 1 shows a flow chart of the stage of uploading identity data of the method for identity verification according to an embodiment of the present disclosure.

FIG. 3 shows a lookup table of unique identification (ID) of the identity data corresponding to user accounts of the method for identity verification according to an embodiment of the present disclosure.

FIG. 4 shows a flow chart of the stage of identity verification of the method for identity verification according to an embodiment of the present disclosure.

DETAILED DESCRIPTION OF THE INVENTION

The following describes the method for identity verification and the system thereof of the present disclosure through embodiments and drawings. With the present disclosure, those skilled in the art can understand the technology and effect of the present disclosure. However, the content disclosed below is not intended to limit the scope of the claimed subject matter. Without departing from the spirit of the present disclosure, those ordinarily skilled in the art can implement the present disclosure with embodiments of different structures and operating orders.

Figure 2A:
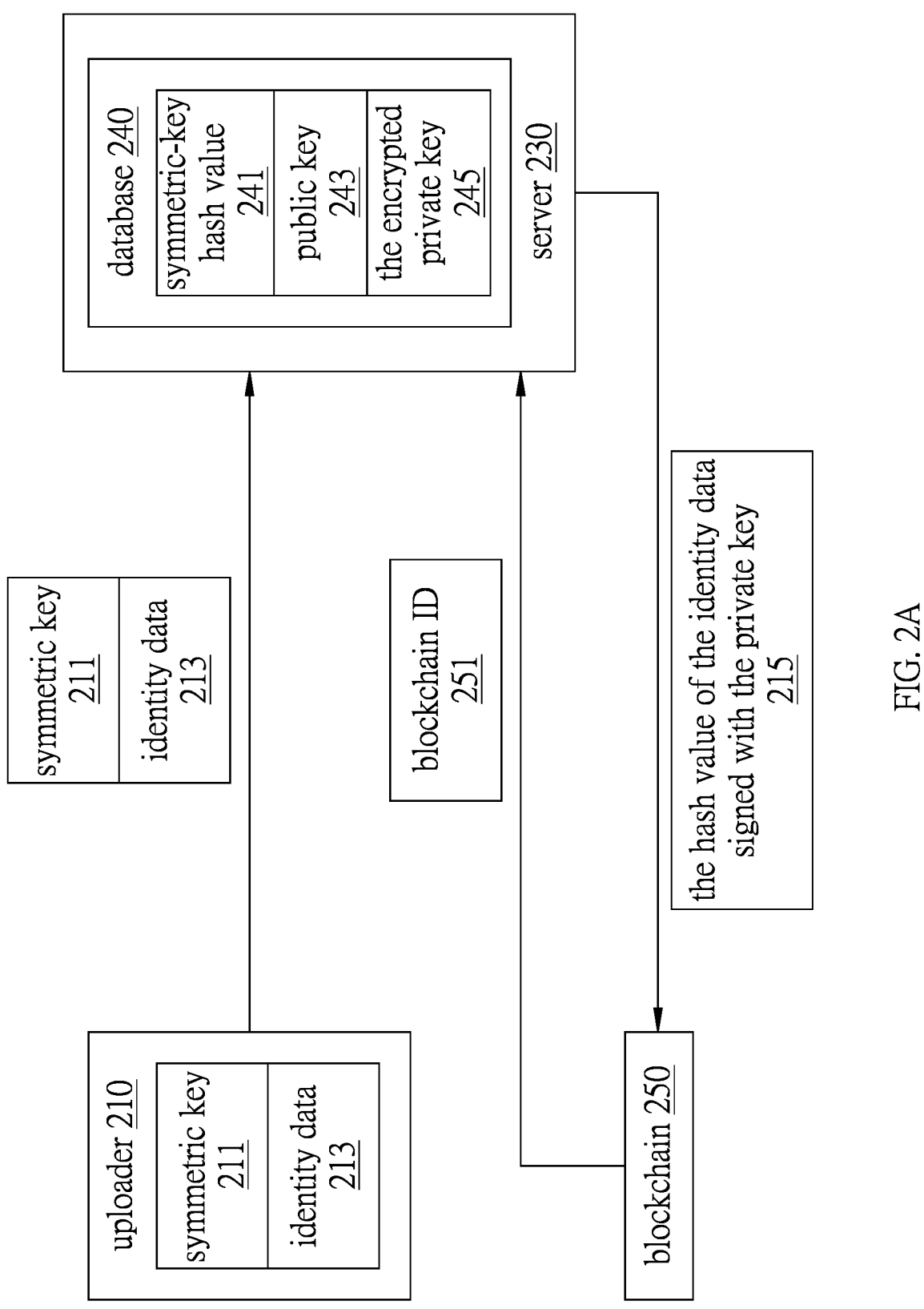
FIG. 2A shows a schematic block diagram of the stage of uploading identity data of the method for identity verification according to an embodiment of the present disclosure.

Referring to FIG. 1 and FIG. 2A, an embodiment of the method for identity verification of the present disclosure is illustrated. In this embodiment, the method for identity verification includes the stage S100 of uploading identity data and the stage S400 of identity verification (refer to the description of FIG. 4). Refer to the schematic block diagram illustrating the stage S100 of uploading identity data in FIG. 2A. These blocks include an uploader 210 providing identity data 213, a server 230 implementing the method, and a blockchain 250, wherein the server 230 includes a database 240 and connects to the blockchain 250 through s communication network. In this embodiment, the uploader 210 is the entity that grants, permits, or issues the identity data 213. For example, the identity data 213 can be a certificate, license, or any certification document related to identity or authority, and the uploader 210 can be a school, institution, organization, etc. For example, a school can upload the certificates of degree/diploma of its graduates to the server 230, then the school is the uploader 210, and a certificate of degree/diploma is the identity data 213. It should be noted that the uploader 210 and the identity data 213 described above are only illustrative examples. In different embodiments, the uploader 210 and the identity data 213 can be of other types, and the present disclosure is not limited thereto.

In addition, each uploader 210 has a unique symmetric key 211 (such as the Advanced Encryption Standard (AES) algorithm), and at the same time, the database 240 stores the symmetric-key hash value 241, which is calculated from the symmetric key 211 with the hash algorithm. In addition, corresponding to each uploader 210, a unique set of asymmetric key pairs (such as the RSA encryption algorithm) will be generated, wherein the database 240 stores the public key 243 of the key pair and the private key 245 encrypted with the symmetric key 211. It should be noted that the algorithms used in the aforementioned symmetric key 211 and the asymmetric key pair are illustrative examples. In different embodiments, other algorithms may be used to generate the symmetric key 211 (such as the data encryption standard (DES) algorithm) and asymmetric key pairs (such as the ElGamal encryption algorithm), and the present disclosure is not limited thereto.

Figure 2B:
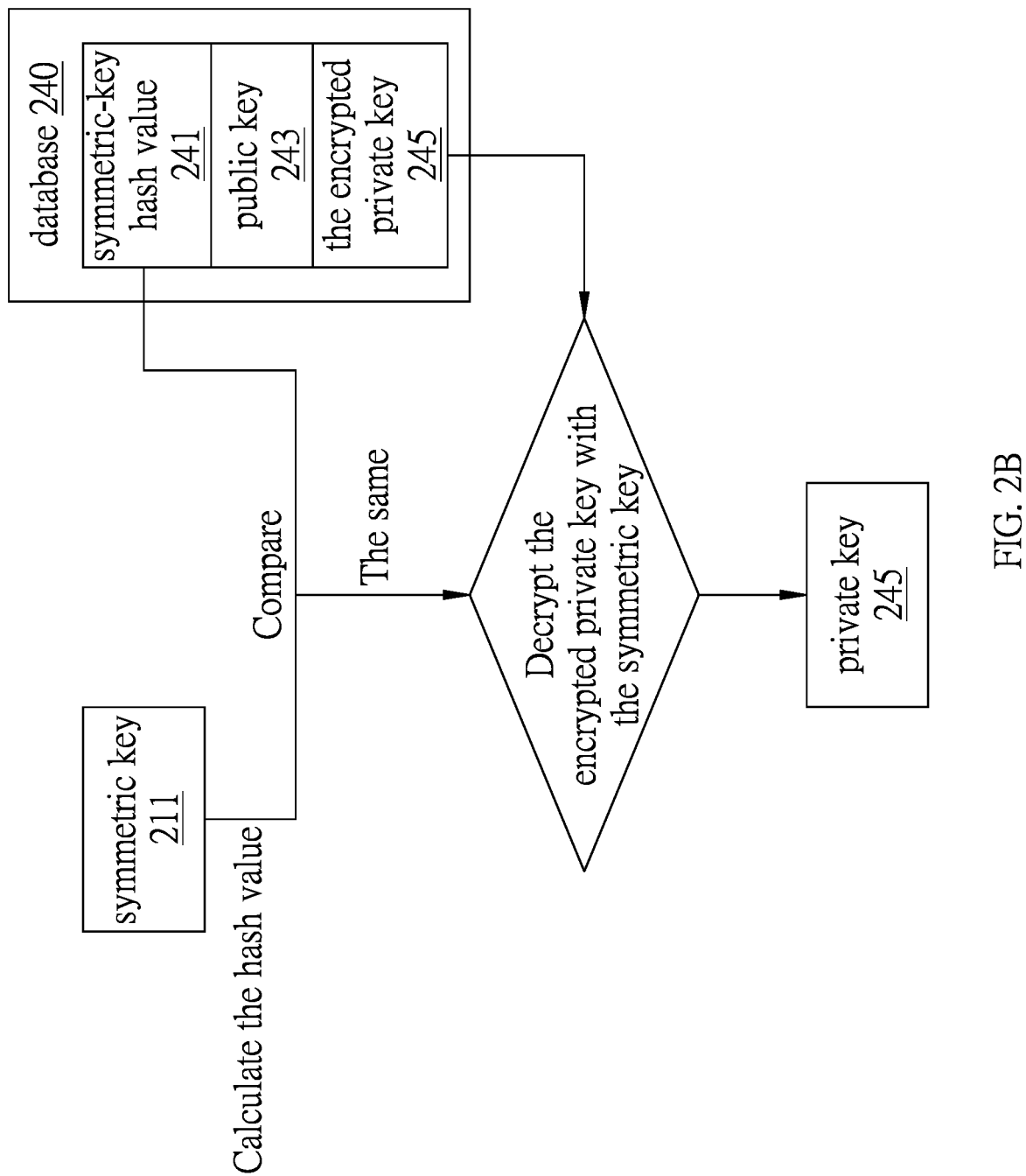
FIG. 2B shows a schematic block diagram of the stage of uploading identity data of the method for identity verification according to an embodiment of the present disclosure.

Referring to FIG. 1, FIG. 2A, and FIG. 2B, the embodiment is continued. At step S103, the method includes receiving by the server 230 the symmetric key 211 and the identity data 213 from the uploader 210, and at step S105, the method includes calculating the hash value of the received symmetric key 211 and comparing it with the symmetric-key hash value 241 stored in the database 240. When the two are the same, the symmetric key 211 is used to decrypt the encrypted private key 245 stored in the database 240. Referring to FIG. 2B, since different data will generate different hash values after hash calculation, the comparison can be successful only when the correct symmetric key is provided by the uploader 210, and then the decrypted private key 245 can be obtained. Under this configuration, due to the uniqueness of the symmetric key 211 owned by each uploader 210, the server 230 can confirm the identity of the uploader 210 by comparing the hash value, and at the same time ensure that the identity data 213 is provided from an authorized uploader 210.

Figure 2C:
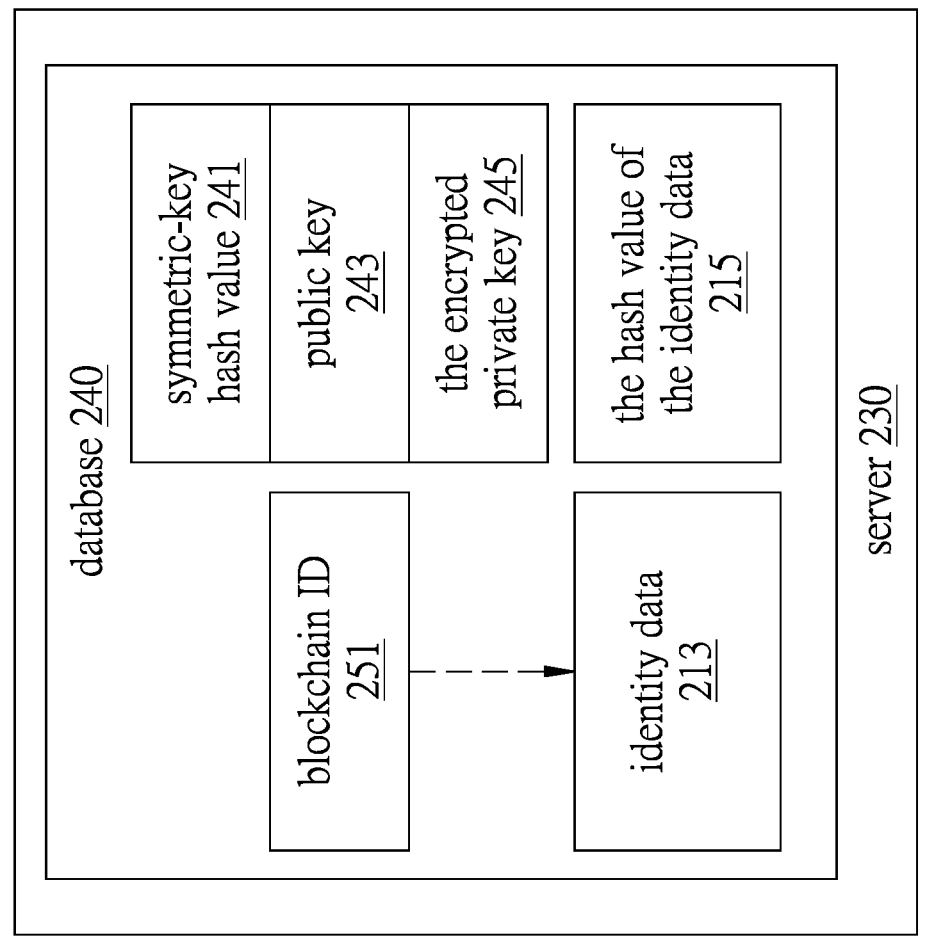
FIG. 2C shows a schematic block diagram of the method for identity verification after uploading identity data according to an embodiment of the present disclosure.

Referring to FIG. 1, FIG. 2A, and FIG. 2C, this embodiment is continued. At step S107, the method includes calculating the hash value of the identity data 213 and storing the identity data 213 and the hash value of the identity data 215 in the database 240. At step S109, the method includes signing the hash value of the identity data 215 with the decrypted private key 245 and uploading it to the blockchain 250. Referring to FIG. 2C, after the aforementioned steps are completed, the identity data 213 and the hash value of the identity data 215 are stored in the database 240, and the hash value of the identity data 215 signed with the private key is stored in the blockchain 250. In addition, the decrypted private key 245 will not be stored in the server 230 after the server 230 uploads the signed hash value of the identity data 215 to the blockchain 250. Under this configuration, since the database 240 of the server 230 only stores the symmetric-key hash value 241 and the encrypted private key 245, if the uploader 210 does not provide the symmetric key 211, the server 230 cannot decrypt the private key 245, and the private key 245 cannot be used for signing. In this way, the uploader 210 can ensure the correctness of the source of the identity data 213 uploaded to the blockchain 250. In addition, since the identity data 213 uploaded to the blockchain 250 is a hash value calculated with the hash algorithm, the breach of the identity data 213 on the network can be avoided.

At step S111, the method further includes obtaining a blockchain ID 251 (such as a Message-ID or a Transaction ID, etc.), and storing the blockchain ID 251 in the database 240 in a manner associated with the identity data 213 (refer to FIG. 2C). Wherein the blockchain ID 251 can be a string of hexadecimal codes, such as "a05fbd93b26d6304d6e1f5ea6f231 ffe9bebe6b033ba7544ea29b0f73beb7935". With a blockchain browser (such as the IOTA blockchain browser: https://explorer.iota.org/mainnet), the blockchain ID 251 can be used to query the data corresponding to the blockchain ID 251. It should be noted that the aforementioned blockchain ID 251 and blockchain browser are only exemplary illustrations. In different embodiments, blockchains other than IOTA can also be used, and different types of blockchain ID 251 and blockchain browsers can be used corresponding to different blockchains. The present disclosure is not limited thereto.

Referring to FIG. 3, the present embodiment is continued. FIG. 3 shows a lookup table 300 of the user account 301 corresponding to the unique ID of the identity data 303. In this embodiment, the method S100 includes a step S113. At step S113, the method includes generating a unique ID of the identity data 303 corresponding to the identity data 213 and storing the unique ID of the identity data 303 in the database 240 in a manner associated with the user account 301. Wherein the unique ID of the identity data 303 is unique corresponding to the identity data 213, which means that different identity data 213 will generate different unique IDs of the identity data 303 so that the identity data 213 can be identified through the unique ID of the identity data 303. In addition, each user account 301 corresponds to a user, and each user may have multiple identities or permissions, so each user account 301 may also be associated with a plurality of different unique IDs of the identity data 303. For example, referring to the lookup table 300 shown in FIG. 3, the same user may have a certificate of degree (unique ID of the identity data 303 is ID_1) issued by a certain school and a professional license (unique ID of the identity data 303 is ID_2) issued by a certain institution at the same time, so the lookup table 300 shows that the unique IDs of the identity data 303 that the user account 301 (Example_1) has are ID_1 and ID_2. With this configuration, it is possible to check whether the user account 301 has the specified unique ID of the identity data 303, and then determine whether the user account 301 has the specified identity data 213, so as to determine whether the user has the specified identity or authority. It should be noted that although this embodiment uses the lookup table 300 to show the association between the user account 301 and the unique ID of the identity data 303, in different embodiments, the unique ID of the identity data 303 can also be associated with the user account 301 in another manner. The present disclosure is not limited thereto.

Referring to FIG. 3 and FIG. 4, the method for identity verification of an embodiment of the present disclosure is continued. In this embodiment, the method for identity verification includes an identity verification stage S400 in addition to the stage S100 of uploading identity data. At step S401, the method includes determining whether the user account 301 has the identity data 213, including determining whether the user account 301 is associated with the unique ID of the identity data 303. After the aforementioned stage S100 of uploading identity data, the database 240 has stored the identity data 213 uploaded by the uploader 210, and the unique ID of the identity data 303 corresponding to the identity data 213 is also stored in the database 240 in a manner associated with the user account 301 (such as the lookup table in FIG. 3). With the lookup table 300 shown in FIG. 3, it can be determined whether the user account 301 is associated with a specific unique ID of the identity data 303 (such as ID_1), and then it can be determined whether the user account 301 has the identity data 213 (such as certificate of degree/diploma) corresponding to the unique ID of the identity data 303. With this configuration, the server 230 can preliminarily confirm whether the user account 301 has the specified identity or authority, so as to facilitate the verification of the identity data 213 later.

Referring to FIG. 2C and FIG. 4, the present embodiment is continued. At step S403, the method includes obtaining from the blockchain 250 the hash value of the identity data 215 signed with the private key 245 if it is determined that the user account 301 has the identity data 213. In the stage S100 of uploading identity data, the identity data 213 provided by the uploader 210 has been calculated with the hash algorithm, signed with the private key 245, and uploaded to the blockchain 250 (see FIG. 2C). In this embodiment, the server 230 can obtain from the blockchain 250 the hash value of the identity data 215 signed with the private key 245 through the blockchain ID 251 stored in the database 240 and corresponding to the identity data 213, and through the blockchain browser as described above. At step S405, the method includes using the public key 243 to verify the hash value of the identity data 215 signed with the private key 245 to obtain the decrypted hash value of the identity data 215. Under this configuration, since the public key 243 and the private key 245 stored in the database 240 are an asymmetric key pair, if the hash value of the identity data 215 signed with the private key 245 is successfully verified and decrypted with the public key 243, it can be confirmed again that the identity data 213 comes from the uploader 210 corresponding to the private key 245.

At step S407, the method includes comparing the decrypted hash value of the identity data 215 with the hash value of the identity data 215 stored in the database 240 to generate an identity verification result. In the stage S100 of uploading identity data, the hash value of the identity data 215 is not only stored in the database 240 but also uploaded to the blockchain 250 (refer to FIG. 2C). Due to the blockchain 250's characteristics of being difficult to tamper with, by comparing the hash value of the identity data 215 stored in the database 240 with the hash value of the identity data 215 obtained and decrypted from the blockchain 250, it can be confirmed whether the identity data 213 is forged. Specifically, when the above two are the same, it can be confirmed that the identity data 213 has not been forged, thereby generating an identity verification result that the identity verification is successful. On the contrary, when the aforementioned two are not the same, it can be determined that the identity data 213 has been forged, thereby generating an identity verification result implicating that the identity verification failed.

Figure 5:
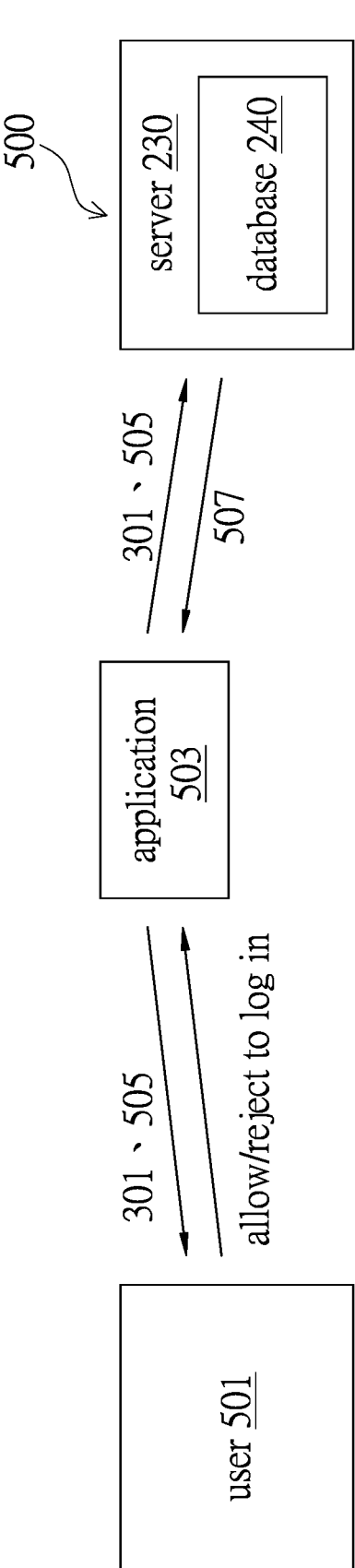
FIG. 5 shows a schematic block diagram of a system for identity verification according to another embodiment of the present disclosure.

Referring to FIG. 5, an identity verification system 500 according to another embodiment of the present disclosure is illustrated. The identity verification system 500 may include the server 230 and the database 240 in the foregoing embodiments. In this embodiment, the user 501 can enter the user account 301 and the user password 505 into the application 503, and the application 503 sends the user account 301 and the user password 505 to the server 230 through the network after receiving them. The server 230 can first verify the user account 301 and the user password 505, and if the verification is successful, it can execute the identity verification stage S400 in the above-mentioned embodiment according to the identity or authority required by the application 503 to obtain the identity verification result 507 (e.g., success or failure). After the application 503 receives the identity verification result 507 returned from the server 230, the user 501 is allowed to log in to the application 503 if the identity verification result 507 is successful, otherwise, the user is rejected from logging in to the application 503. Wherein the application 503 can be a mobile application, a website, or any other service provider with a specific identity or authority requirement. Under this configuration, the application 503 does not need to obtain or store any identity data 213 of the user 501 to achieve the purpose of identity verification, and the user 501 does not need to repeatedly provide identity data 213 to different applications 503, thereby reducing the possibility of a data breach.

The above disclosure is only a preferred embodiment of the present invention and is not intended to limit the scope of the claims of the present invention. The sequence of the method described herein is only an exemplary illustration, and those ordinary skilled in the art can modify the sequence of the processes under the equivalent concept of the present invention. In addition, unless there is a clear contradiction with the context, the singular terms "a" and "the" used in this context also includes plural situation. The shapes, positions, and sizes of each element, component, and unit in the accompanying drawings are intended to illustrate the technical content of the present invention concisely and clearly, rather than limiting the present invention. Also, the well-known details or constructions will be omitted from the drawings.

What is claimed is:

1. A method for identity verification implemented by a server, a database of the server stores a public key of a unique asymmetric key pair generated by the server corresponding to an uploader, identity data, and a hash value of the identity data, wherein the server is connected to the uploader and a blockchain through a communication network, the blockchain stores the hash value of the identity data signed with a private key of the unique asymmetric key pair, and the method includes:

determining whether a user account has the identity data;
  obtaining from the blockchain the hash value of the identity data signed with the private key if it is determined that the user account has the identity data;
  using the public key to verify the hash value of the identity data signed with the private key to obtain a decrypted hash value of the identity data; and
  comparing the decrypted hash value of the identity data with the hash value of the identity data stored in the database to generate an identity verification result,
  wherein the database of the server further stores a symmetric-key hash value corresponding to a symmetric key and the private key encrypted with the symmetric key, and the method further includes:
  receiving the symmetric key and the identity data by the server;
  calculating a hash value of the symmetric key at the server for comparison with the symmetric-key hash value;
  decrypting the private key encrypted with the symmetric key with the symmetric key according to the comparison result of the calculated hash value of the symmetric key being the same as the symmetric-key hash value;
  calculating the hash value of the identity data;
  storing the identity data, the hash value of the identity data in the database; and signing the hash value of the identity data with the private key decrypted and uploading the hash value of the identity data signed with the private key to the blockchain.

2. The method of claim 1, further comprising generating a unique identification (ID) of the identity data, and storing the unique ID of the identity data in the database in a manner associated with the user account.

3. The method of claim 2, wherein determining whether the user account has the identity data includes:

determining that the user account has the identity data according to the user account being associated with the unique ID of the identity data.

4. The method of claim 1, wherein uploading the hash value of the identity data signed with the private key to the blockchain further includes:

storing a blockchain ID in the database in a manner associated with the identity data, wherein the blockchain ID corresponds to the hash value of the identity data signed with the private key and stored in the blockchain.

5. The method of claim 4, wherein obtaining the hash value of the identity data signed with the private key from the blockchain includes:

retrieving from the blockchain through the blockchain ID to obtain the hash value of the identity data signed with the private key.

6. A system for identity verification, including a server comprising at least one computing device and a database, wherein the server is connected to a blockchain through a communication network, and the at least one computing device of the server is configured to:

receive an input of a user account and a user password from a user of an application through the communication network;

verify the identity of the user according to the method of claim 1, after confirming that the user account number and the user password are correct, to generate an identity verification result, wherein the identity verification result includes success or failure; and return the identity verification result to the application, wherein the application allows the user to log in to the application if the identity verification result received shows success.

\* \* \* \* \*